US012567329B2

(12) United States Patent
Dudar et al.

(10) Patent No.: US 12,567,329 B2
(45) Date of Patent: Mar. 3, 2026

(54) SYSTEMS AND METHODS TO MINIMIZE WALKING IN A MULTI-LEVEL PARKING STRUCTURE

(71) Applicant: Ford Global Technologies, LLC, Dearborn, MI (US)

(72) Inventors: Aed M. Dudar, Canton, MI (US); Mahmoud Yousef Ghannam, Canton, MI (US)

( * ) Notice: Subject to any disclaimer, the term of this patent is extended or adjusted under 35 U.S.C. 154(b) by 254 days.

(21) Appl. No.: 18/333,054

(22) Filed: Jun. 12, 2023

(65) Prior Publication Data

US 2024/0412633 A1 Dec. 12, 2024

(51) Int. Cl.
*G08G 1/14* (2006.01)

(52) U.S. Cl.
CPC ............ *G08G 1/145* (2013.01); *G08G 1/141* (2013.01)

(58) Field of Classification Search
CPC .............................. G08G 1/145; G08G 1/141
USPC ...................................................... 340/932.2
See application file for complete search history.

(56) References Cited

U.S. PATENT DOCUMENTS 10,648,831 B2 5/2020 Beaurepaire et al.
10,657,816 B2 5/2020 Bostick et al.
10,964,209 B2 3/2021 Publicover et al.
2007/0008181 A1* 1/2007 Rollert .................. G06Q 10/02 340/932.2
2008/0033640 A1* 2/2008 Amano ............. G01C 21/3476 701/414
2012/0161986 A1* 6/2012 Amir ...................... G06Q 50/40 340/932.2
2013/0194404 A1* 8/2013 Christiansen ...... A61B 1/00188 348/67
2014/0350853 A1* 11/2014 Proux .................... G01C 21/34 701/533

(Continued)

FOREIGN PATENT DOCUMENTS

KR 20180057802 A 5/2018

OTHER PUBLICATIONS

Imen Boudali, Smart Parking Reservation System Based on Distributed Multicriteria Approach, Applied Artificial Intelligence, an International Journal, vol. 3, Nos. 506, 518-537, 2017.

*Primary Examiner* — Kam Wan Ma
(74) *Attorney, Agent, or Firm* — Emily Campbell; Eversheds Sutherland (US) LLP

(57) ABSTRACT

The disclosure is generally directed to systems and methods that minimize walking inside a multi-level parking structure. An example method that may be performed by a processor can include determining a first walking distance between a first unoccupied parking spot on a first parking level of a multi-level parking structure and a destination located outside the multi-level parking structure and can further include determining a second walking distance between a second unoccupied parking spot on a second parking level of the multi-level parking structure and the destination located outside the multi-level parking structure. The first walking distance is compared to the second walking distance and based on a shorter of the first walking distance and the second walking distance, guidance is provided to drive to one of the first unoccupied parking spot or the second unoccupied parking spot. The guidance may be provided via an infotainment system of the vehicle.

10 Claims, 7 Drawing Sheets

(56) References Cited

U.S. PATENT DOCUMENTS

| | | | | |
|---|---|---|---|---|
| 2016/0117925 | A1 | 4/2016 | Akavaram et al. | |
| 2019/0063947 | A1* | 2/2019 | Beaurepaire ....... | G01C 21/3423 |

* cited by examiner

SYSTEMS AND METHODS TO MINIMIZE WALKING IN A MULTI-LEVEL PARKING STRUCTURE

BACKGROUND

A typical driver looking for a parking spot in a parking lot typically grabs the first unoccupied parking spot that is in view. In some cases, the driver may harbor a hope that another unoccupied parking spot may be available elsewhere in the parking lot and closer to a destination (store, shop, building entrance, etc.). However, rather than taking a chance to locate such an unoccupied parking spot and losing the one that is currently in view, the driver may park in the available unoccupied parking spot and walk, what may, in some cases, turn out to be an extra distance, in order to reach the destination.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
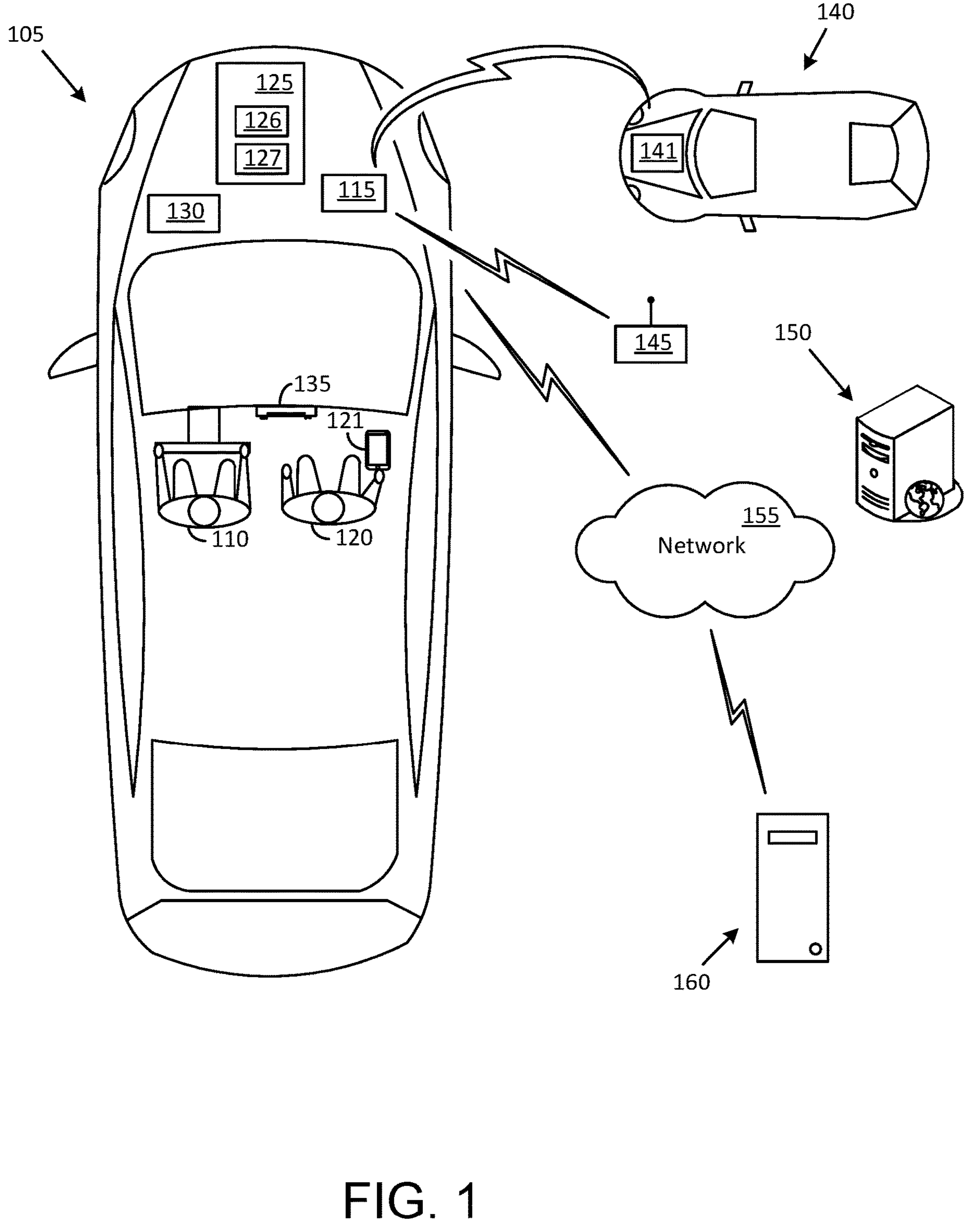
FIG. 1 shows an example vehicle that includes a parking assistance system in accordance with an embodiment of the disclosure.

In terms of a general overview, embodiments described in this disclosure are generally directed to systems and methods that minimize walking inside a multi-level parking structure. An example method that may be performed by a processor can include determining a first walking distance between a first unoccupied parking spot on a first parking level of a multi-level parking structure and a destination located outside the multi-level parking structure. The method further includes determining a second walking distance between a second unoccupied parking spot on a second parking level of the multi-level parking structure and the destination located outside the multi-level parking structure. The first walking distance is compared to the second walking distance and, based on a shorter of the first walking distance and the second walking distance, guidance is provided to drive to one of the first unoccupied parking spot or the second unoccupied parking spot. In an example implementation, the guidance is provided in the form of visual and/or audible instructions through an infotainment system in the vehicle and/or through a personal device of the driver of the vehicle. The personal device can be a smartphone carried by the driver of the vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, words such as "level," "floor," and "deck" may be used interchangeably in this disclosure. Phrases such as "ground floor," "ground level," "ground floor parking deck," and "ground floor parking level" may be used interchangeably herein. It should also be understood that the phrase "first floor" as used herein refers to a floor or deck located above a ground floor. The terms "walking distance" and "separation distance" may be used interchangeably in this disclosure. More particularly the phrase "separation distance" as used herein may be quantified in various ways in various implementations. Thus, in a first implementation, a separation distance may be determined on the basis of walking steps of an individual having average physical attributes (height, walking stride, etc.). In another implementation, a separation distance may be determined on the basis of measurements such as yards, feet, and meters.

Furthermore, it must be understood that the word "information" as used herein generally refers to digital content (images, data, etc.) that can be operated upon by a processor for performing various operations in accordance with the disclosure. The digital content can include, for example, images captured by any of various types of cameras and can also include sensor signals produced by any of various types of sensors. The cameras and/or sensors may be provided in a multi-level parking structure and/or in a vehicle. Images, as referred to herein, may be obtained by use of various types of image capture devices (still camera, digital camera, video camera, smartphone, etc.). The various forms of images/photographs can include still photographs, video clips, real-time video, movies, still frames etc. A still frame is a single static image that may be obtained from a video clip or a video stream. A video clip is generally composed of a set of images that are captured sequentially over a period of time. Thus, a description below with respect to a single image is equally applicable to a video clip for example. The word "vehicle" as used in this disclosure can pertain to any one of various types of vehicles such as, for example, cars, vans, sports utility vehicles, trucks, electric vehicles, gasoline vehicles, and hybrid vehicles. Furthermore, the description provided herein is applicable to various vehicles incorporating various kinds of driving automation such as, for example, the six levels of driving automation that is defined by the Society of Automotive Engineers (SAE) as ranging from Level 0 (fully manual) to Level 5 (fully autonomous). More particularly, it must be understood that the various actions performed by a driver of a vehicle, as described herein can be performed by a controller of an autonomous vehicle independently or in cooperation with the driver. It must also be understood that words such as "implementation," "application," "scenario," "case," and "situation" as used herein are an abbreviated version of the phrase "In an example ("implementation," "application," "scenario," "case," "approach," and "situation") in accordance with the disclosure." It must also be understood that the word "example" as used herein is intended to be non-exclusionary and non-limiting in nature.

FIG. 1 shows a vehicle 105 that includes a parking assistance system 125 in accordance with an embodiment of the disclosure. The parking assistance system 125 can include a processor 126 that is configured to execute computer-executable instructions stored in a memory 127 for performing various operations in accordance with the disclosure. The vehicle 105 may further include components such as, for example, a vehicle controller 130, a communications system 115, and an infotainment system 135.

The vehicle controller 130 may be operated to execute various operations related to the vehicle 105, such as, for example, controlling engine operations (fuel injection, speed control, emissions control, braking, etc.), managing climate controls (air conditioning, heating etc.), activating airbags, and issuing messages (check engine light, bulb malfunction, low tire pressure, etc.), and also for executing various operations in accordance with disclosure.

In the illustrated example scenario, the vehicle 105 is a driver-operated vehicle. In another example scenario, the vehicle 105 is an autonomous vehicle and the vehicle controller 130 performs some or all of various operations that may replicate those performed by a driver 110 of the vehicle 105. More particularly, the vehicle controller 130 of the autonomous vehicle can perform various operations in cooperation with the parking assistance system 125 for identifying an unoccupied parking spot that minimizes walking in a multi-level parking structure in accordance with the disclosure. Such operations performed by the vehicle controller 130 can replicate actions carried out by the driver 110.

The infotainment system 135 may include a combination of various entertainment items (such as a radio, streaming audio solutions, etc., and USB access ports for digital audio devices). The infotainment system 135 may also include other types of items, such as, for example, a navigation system and a graphical user interface (GUI) that is displayed on a display screen. The driver 110 may use the GUI for interacting with the parking assistance system 125 and for executing various operations in accordance with the disclosure. Some example operations can include receiving, via the infotainment system 135, visual and/or audible guidance to travel to an unoccupied parking spot inside a multi-level parking structure. In an example implementation, the guidance can be turn-by-turn instructions such as typically provided by a global positioning satellite (GPS) navigation system.

In some implementations, at least some components of the parking assistance system 125 may be provided in a personal device 121 carried by the driver 110 and/or a passenger 120 of the vehicle 105. The components may be provided in the form of a software application that is downloadable into the personal device 121. In an example scenario, the software application can be executed by the driver 110 and/or the passenger 120 for obtaining guidance (image and/or audible instructions) along a walking route from the vehicle 105 to a destination located outside the multi-level parking structure. The guidance provided via the personal device 121 for the walking route can be step-by-step instructions such as typically provided by a GPS navigation system used for walking.

The communication system 115 of the vehicle 105 is configured to wirelessly communicate with various devices such as, for example, a computer 160, a cloud computer 150, an Internet-of-Things (IoT) communication system 145, and a parking assistance system 141 provided in a vehicle 140. The parking assistance system 141 provided in the vehicle 140 may be substantially identical to the parking assistance system 125 provided in the vehicle 105 and may be configured to perform functions that are substantially identical to functions performed by the parking assistance system 125.

The vehicle 140 can be, for example, another vehicle that is moving around, or is parked, in a multi-level parking structure in which the vehicle 105 is seeking an unoccupied parking spot. In an example scenario, the vehicle 140 may provide to the vehicle 105, by use of the parking assistance system 141, information regarding one or more unoccupied parking spots that may be present in the multi-level parking structure at a time when the driver 110 of the vehicle 105 is seeking to park in the multi-level parking structure. The parking assistance system 125 of the vehicle 105 can evaluate the received information and identify an unoccupied parking spot that minimizes a walking distance for the driver 110 inside the multi-level parking structure in accordance with the disclosure.

The wireless communications may be carried out via device-to-device communications and/or via a network 155. The device-to-device communications may involve, for example, vehicle-to-vehicle (V2V) communications that may be used by the communication system 115 of the vehicle 105 to communicate with the parking assistance system 141 of the vehicle 140, and vehicle-to-infrastructure (V2I) communications that may be used by the communication system 115 of the vehicle 105 to communicate with the IoT communication system 145.

The network 155 may include any one, or a combination of networks, such as, for example, a local area network (LAN), a wide area network (WAN), a telephone network, a cellular network, a cable network, a wireless network, and/or private/public networks such as the Internet. At least one portion of the network 155 includes a wireless communication link such as, for example, a cellular communication link, a WiFi communications link, an ultra-wideband (UWB) communication link, and a Bluetooth® communication link.

The computer 160 can be any of various types of computers such as, for example, a server computer, a client device, a personal computer, and/or a distributed computer (multiple computers operating in cooperation with each other as a single computing entity). In an example implementation, the computer 160 is a server computer configured to store information about parking spots in a multi-level parking structure as well as other information such as, for example, about buildings located within walking distance of the multi-level parking structure. The information, which can include occupancy and/or vacancy information of various parking spots, can be wirelessly conveyed to the parking assistance system 125 of the vehicle 105.

The cloud computer 150 may be used either independently or together with the computer 160 to store information about parking spots in a multi-level parking structure as well as other information such as, for example, about buildings located within walking distance of the multi-level parking structure. The stored information may include, for example, location coordinates of various occupied and/or unoccupied parking spots in the multi-level parking structure.

The IoT communication system 145 can be configured to execute various functions such as, for example, to convey to the parking assistance system 125, information received from devices such as, for example, the computer 160 and/or the cloud computer 150, about parking spots in a multi-level parking structure. The IoT communication system 145 can be further configured to relay information transmitted by the parking assistance system 125 to devices such as the computer 160, the cloud computer 150, and/or another IoT roadside unit (not shown).

Figure 2:
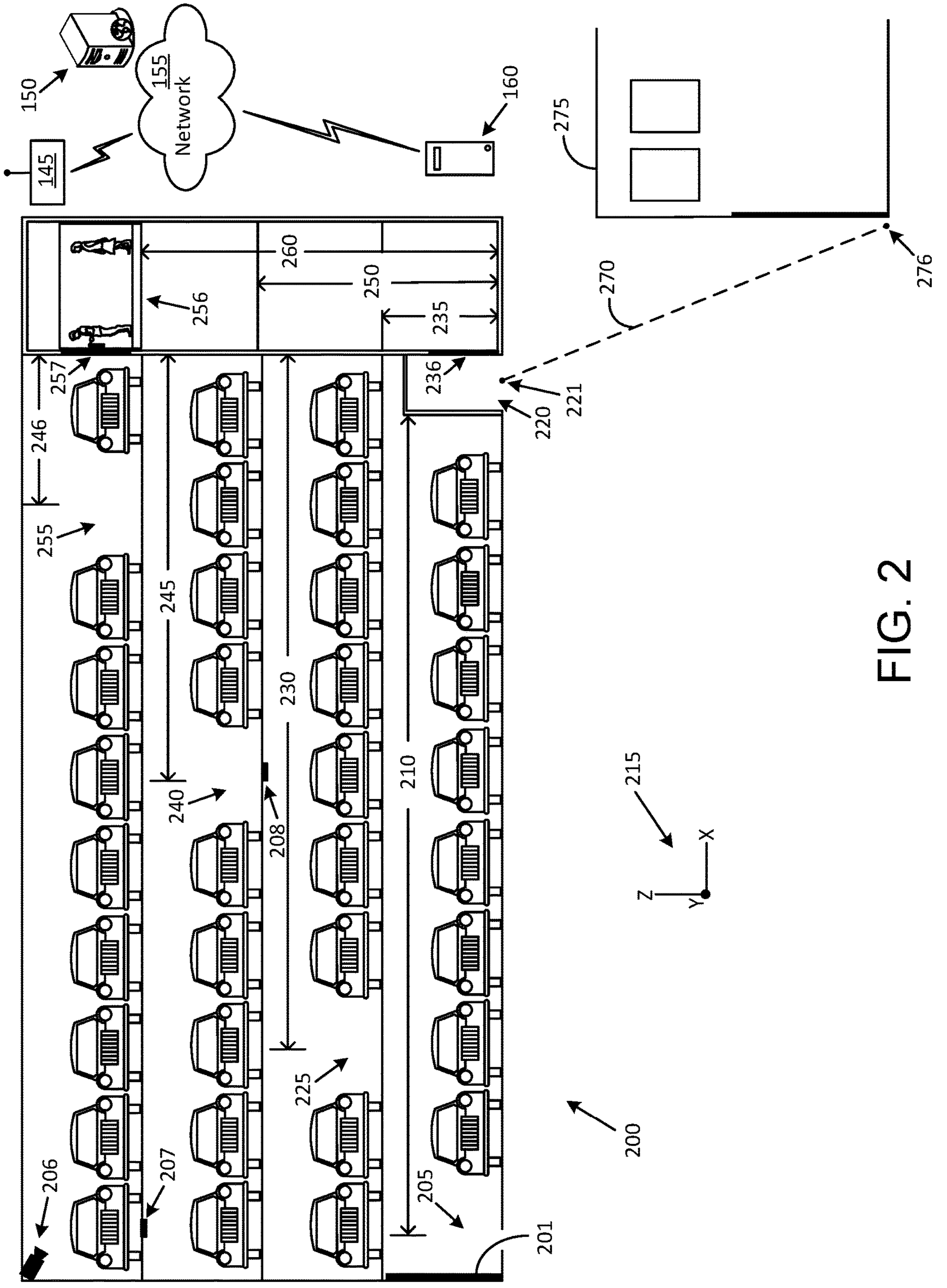
FIG. 2 shows a first example scenario where a parking assistance system may be used in accordance with an embodiment of the disclosure.

FIG. 2 shows a first example scenario where the parking assistance system 125 may be used in accordance with an embodiment of the disclosure. In this example scenario, the vehicle 105 that is described above may enter a multi-level parking structure 200 through an example vehicle entrance 201 on the ground floor. The multi-level parking structure 200 can be any of various kinds of structures such as, for example, a parking garage attached to a building (business, hospital, mall, etc.) or a parking garage located at a walking distance from a business, a hospital, a mall, etc.

In the illustrated scenario, the multi-level parking structure 200 includes four parking levels and is located within walking distance of a building 275. Three of the four parking levels are above the ground floor parking level. An elevator 256 is located at one end of the multi-level parking structure 200 in this example. The elevator 256 may be used by people ascending to any of the various levels or descending to the ground floor from any of the various levels. The elevator 256 may be located elsewhere in other scenarios. A stairwell (not shown) may also be provided for people who chose to walk up, or walk down, one or more flight of stairs. A pedestrian exit 220 that is located on the ground floor of the multi-level parking structure 200 may be used by pedestrians commuting between the multi-level parking structure 200 and the building 275. In this example, the pedestrian exit 220 is located close to an elevator door 236 of the elevator 256.

In an example implementation, the computer 160 that was described above may be located onsite at the multi-level parking structure 200 (in a computer room, cubicle, cabinet, etc.) and is configured to access various devices such as, for example, the IoT communication system 145 and the cloud computer 150. Various components of the IoT communication system 145 may be distributed at various locations inside the multi-level parking structure 200. For example, various relays, repeaters, antennae may be provided on each level of the multi-level parking structure 200 so as to allow vehicles located inside the multi-level parking structure 200 to communicate by use of V2I technology. In some implementations, alternative communication technologies such as Bluetooth®, Ultra-Wideband, Wi-Fi, Zigbee®, or optical communications may be employed.

In some scenarios, GPS signals may be unavailable in interior areas of the multi-level parking structure 200 and the use of GPS coordinates for position information of various objects may be impractical. In such scenarios, alternative forms of location identification may be employed. For example, a specific parking spot inside the multi-level parking structure 200 may be identified based on physical landmarks, such as, for example, parking spot 39 near pillar 12 on level 3.

Information gathering devices such as cameras and sensors may be provided at various locations in the multi-level parking structure 200 for obtaining real-time information about availability of parking spots in the multi-level parking structure 200. The cameras, which may be mounted on walls of the multi-level parking structure 200 at each level, may be selected to provide a field of view encompassing all parking spots at each level. For example, a camera 206 may be used to capture images of all parking spots in level 4. The images may be conveyed to the computer 160 for storage in a database of the computer 160. A processor (not shown) in the computer 160 may evaluate the images to identify one or more unoccupied parking spots and provide the information, upon request, to the parking assistance systems of various vehicles to assist the drivers of these vehicles locate and park in one of the unoccupied parking spots.

Information related to parking spot availability may also be provided to the computer 160 by sensor devices such as, for example, pressure transducers embedded in the floor of each parking spot. An example pressure transducer 207 senses the weight of a vehicle parked in a parking spot and provide information to the computer 160 about an unavailability of the parking spot for vehicles entering the multi-level parking structure 200. Another example pressure transducer 208 may provide information to the computer 160 about an unoccupied parking spot on the second level parking deck.

In an example scenario, the parking assistance system 125 of the vehicle 105 starts a procedure to locate an unoccupied parking lot, upon entry of the vehicle 105 into the multi-level parking structure 200. More particularly, the procedure is directed at locating an unoccupied parking spot that minimizes a walking distance from the unoccupied parking spot to a destination of the driver 110 (or the passenger 120) of the vehicle 105. In the illustrated example, the destination is an entry 276 to the building 275. Minimizing the walking distance is generally achieved by locating an unoccupied parking spot that entails taking the least amount of walking steps to reach the pedestrian exit 220 of the multi-level parking structure 200. Walking steps occur only in an x-y plane that is horizontal with respect to ground. Traveling in a vertical direction (along a z-axis of the x-y-z plane 215) by use of the elevator 256 eliminates walking steps because an occupant of the elevator 256 typically stands in one place when the elevator 256 is moving. Accordingly, an unoccupied parking spot that entails taking the least amount of walking steps may, in some scenarios, be located on one of the levels above the ground level of the multi-level parking structure 200.

Upon entry of the vehicle 105 into the multi-level parking structure 200 via the vehicle entrance 201, the driver 110 of the vehicle 105 may be tempted to park in an unoccupied parking spot 205 that is located closest to the vehicle entrance 201 and in view of the driver 110. However, by doing so, the driver 110 has to walk over a first separation distance 210 between the unoccupied parking spot 205 and the pedestrian exit 220 of the multi-level parking structure 200. In accordance with the disclosure, the driver 110 may resist the temptation and initiate a procedure to locate a suitable unoccupied parking spot that may involve less walking. In an example implementation, the procedure may be initiated via operations performed upon a touch screen of the infotainment system 135 either prior to the vehicle 105 entering the multi-level parking structure 200 or after the vehicle 105 enters the multi-level parking structure 200.

In some scenarios, launching the procedure prior to entering the multi-level parking structure 200, may allow the parking assistance system 125 to recommend a vehicle entrance other than the vehicle entrance 201, for reaching an unoccupied parking spot. In another example implementation, the procedure may be initiated via operations performed upon a touch screen of the personal device 121 either prior to the vehicle 105 entering the multi-level parking structure 200 or after the vehicle 105 enters the multi-level parking structure 200.

An example procedure to locate a suitable unoccupied parking spot can include the parking assistance system 125 establishing wireless communication with the computer 160 and/or the cloud computer 150 for obtaining information about one or more unoccupied parking spots in the multi-level parking structure 200. The information can include location information (GPS coordinates, physical landmarks, etc.) of the unoccupied parking spots and may further include information about horizontal separation distances between each of the unoccupied parking spots on a ground floor and the pedestrian exit 220 and horizontal separation distances between each of the unoccupied parking spots on levels above the ground floor and a door of the elevator 256 on each respective level. The horizontal separation distances may be determined by the computer 160, by the cloud computer 150, and/or by the parking assistance system 125.

Another example procedure can include the parking assistance system 125 establishing wireless communication with one or more other vehicles in the multi-level parking structure 200 to obtain information about one or more unoccupied parking spots in the multi-level parking structure 200. In an example scenario the parking assistance system 125 can use V2V communications to obtain such information from the parking assistance system 141 provided in the vehicle 140. The vehicle 140 may either be parked in the multi-level parking structure 200 or may detect two or more unoccupied parking spots when moving around the multi-level parking structure 200 looking for an unoccupied parking spot. The parking assistance system 141 provided in the vehicle 140 may detect the two or more unoccupied parking spots based on evaluating images captured by one or more cameras (not shown) in the vehicle 140.

The parking assistance system 125 may then identify the shortest among the horizontal separation distances and may provide guidance to the driver 110 to travel to the unoccupied parking spot that is associated with the shortest horizontal distance.

In the illustrated example, the first separation distance 210 happens to be greater than a second separation distance 230 between an unoccupied parking spot 225 on a first upper deck and a door of the elevator 256 on the first upper deck. The second separation distance 230 happens to be greater than a third separation distance 245 between an unoccupied parking spot 240 on a second upper deck and a door of the elevator 256 on the second upper deck. The third separation distance 245 happens to be greater than a fourth separation distance 246 between an unoccupied parking spot 255 on a third upper deck and a door of the elevator 256 on the third upper deck.

A first vertical distance 235 between the first upper deck and the ground floor of the multi-level parking structure 200, a second vertical distance 250 between the second upper deck and the ground floor of the multi-level parking structure 200, and a third vertical distance 260 between the third upper deck and the ground floor of the multi-level parking structure 200 are disregarded by the parking assistance system 125 when determining the shortest walking distance. Thus, in the illustrated example scenario, the unoccupied parking spot 255 on the third upper deck offers the shortest walking distance to the destination. The shortest walking distance includes a walking path 270 between a point 221 at the pedestrian exit 220 of the multi-level parking structure 200 and the entry 276 to the building 275. The walking path 270 is common to all the example walking distances described above and may be disregarded by the parking assistance system 125 when determining a shortest cumulative walking distance between the unoccupied parking spot 255 on the third upper deck and the entry 276 to the building 275.

In an example embodiment, after determining the shortest cumulative walking distance, the parking assistance system 125 of the vehicle 105 provides guidance to the driver 110 in the form of, for example, turn-by-turn driving instructions displayed on a display screen of the infotainment system 135 for reaching the unoccupied parking spot 255 on the third upper deck.

In an example embodiment, some or all of the components of the parking assistance system 125 may be provided in the personal device 121 in the form of a downloadable software application, for example. In this case, the software application can be launched in the personal device 121 and used to obtain step-by-step walking instructions from the unoccupied parking spot 255 to the elevator door 257 on the third upper deck and from the elevator door 236 on the ground floor to the pedestrian exit 220 and thereon to the entry 276 to the building 275.

Figure 3:
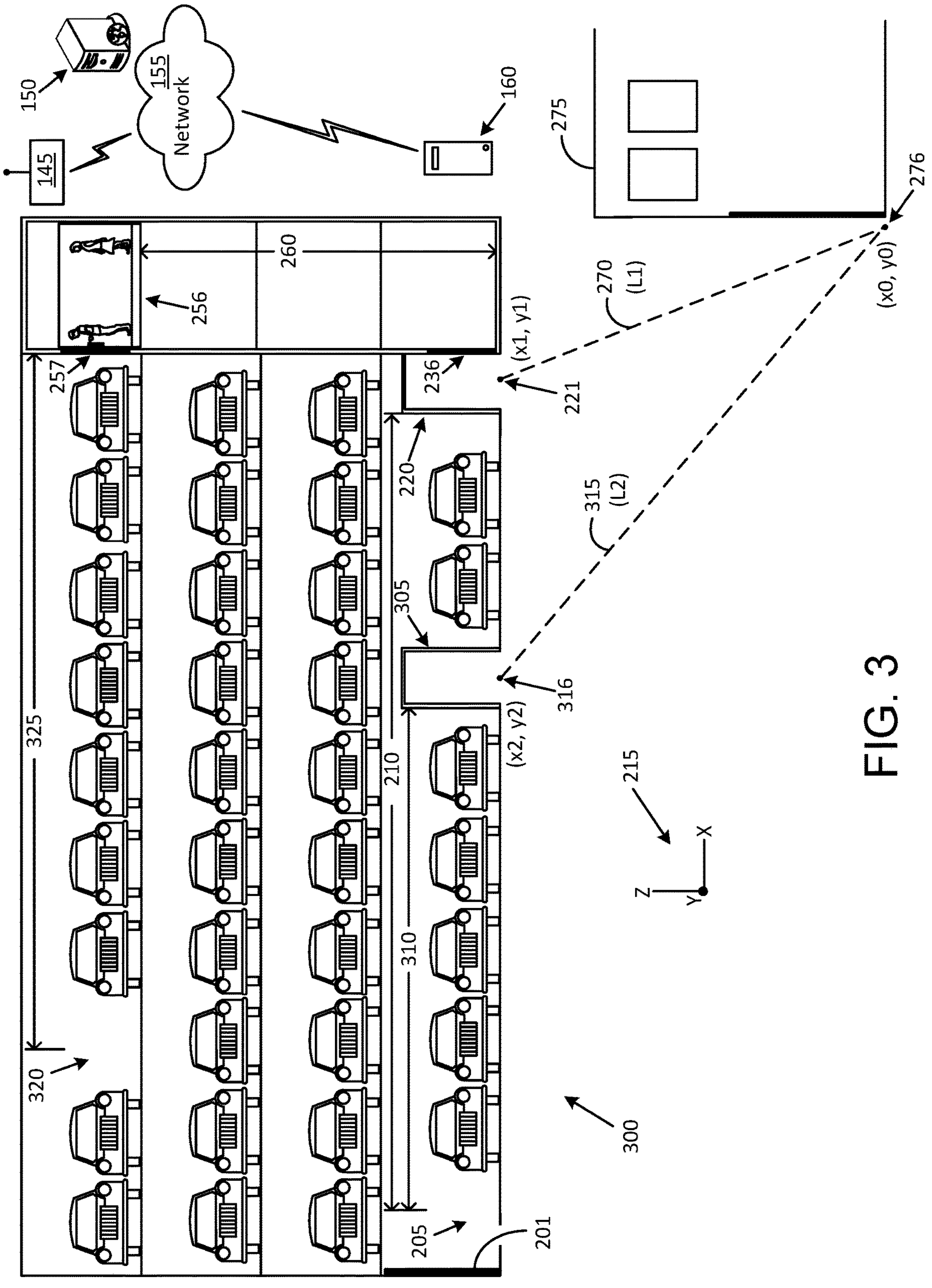
FIG. 3 shows a second example scenario where a parking assistance system may be used in accordance with an embodiment of the disclosure.

FIG. 3 shows a second example scenario where the parking assistance system 125 may be used in accordance with an embodiment of the disclosure. The multi-level parking structure 300 shown in this figure is substantially similar to the multi-level parking structure 200 described above other than the presence of an additional pedestrian exit 305 on the ground floor (in addition to the pedestrian exit 220). A separation distance 310 between the unoccupied parking spot 205 on the ground floor and the additional pedestrian exit 305 is shorter than the first separation distance 210 between the unoccupied parking spot 205 and the pedestrian exit 220.

Furthermore, in this example scenario, there is only one another unoccupied parking spot 320 that is located on the upper-most level of the multi-level parking structure 300. Determining the shortest walking distance between any unoccupied parking spot in the multi-level parking structure 300 and the entry 276 to the building 275 now involves comparing a first cumulative walking distance between the unoccupied parking spot 205 on the ground floor and the entry 276 to the building 275 to a second cumulative walking distance between the unoccupied parking spot 320 on the upper-most level and the entry 276 to the building 275.

In this case, the second cumulative walking distance may or may not be shorter than the first cumulative walking distance because the walking path 270 between the point 221 at the pedestrian exit 220 of the multi-level parking structure 300 and the entry 276 to the building 275 is different in length compared to the walking path 315 between a point 316 at the additional pedestrian exit 305 of the multi-level parking structure 300 and the entry 276 to the building 275.

Determining the shortest cumulative walking distance between the multi-level parking structure 300 and the entry 276 to the building 275 therefore includes determining the length of the walking path 270 and the length of the walking path 315. The vertical distance between the upper-most level and the ground floor (along z-axis) is disregarded because the walking involved when moving down in the elevator 256 is negligible.

In an example embodiment, the length of the walking path 270 is determined by using a first set of location coordinates of the point 221 and a second set of location coordinates of the entry 276 to the building 275. The length of the walking path 315 is determined by using a third set of location coordinates of the point 316 and the second set of location coordinates of the entry 276 to the building 275.

In an example embodiment, the entry 276 is defined by a first set of Cartesian coordinates (x0, y0), the point 221 is defined by a second set of Cartesian coordinates (x1, y1), and the point 316 is defined by a third set of Cartesian coordinates (x2, y2). The respective z0, z1, and z3 values are zero because all the location coordinates are defined at ground level.

The length (L1) of the walking path 270 can be determined by applying Pythagoras' theorem upon the second set of Cartesian coordinates and the first set of Cartesian coordinates. The equation used to do so is:

$$L1=\sqrt{|y1-y0|^2+|x1-x0|^2}$$

The length (L2) of the walking path 315 can be determined by applying Pythagoras' theorem upon the third set of Cartesian coordinates and the first set of Cartesian coordinates. The equation used to do so is:

$$L2=\sqrt{|y2-y0|^2+|x2-x0|^2}$$

The first cumulative walking distance between the unoccupied parking spot 320 on the upper-most level of the multi-level parking structure 300 and the entry 276 to the building 275 is equal to the sum of the separation distance 325 and the distance L1. The second cumulative walking distance between the unoccupied parking spot 205 on the ground floor of the multi-level parking structure 300 and the entry 276 to the building 275 is equal to the sum of the separation distance 310 and the distance L2.

In an example embodiment, after determining the shorter of the first cumulative walking distance and the second cumulative walking distance, the parking assistance system 125 of the vehicle 105 provides guidance to the driver 110 in the form of, for example, turn-by-turn driving instructions displayed on a display screen of the infotainment system 135 for reaching a respective one of the unoccupied parking spot 320 on the upper-most level or the unoccupied parking spot 205 on the ground floor.

In an example embodiment, some or all of the components of the parking assistance system 125 may be provided in the personal device 121 in the form of a downloadable software application, for example. In this case, the software application can be launched in the personal device 121 after the vehicle 105 is parked and used to obtain step-by-step walking instructions to reach the entry 276 to the building 275.

Figure 4:
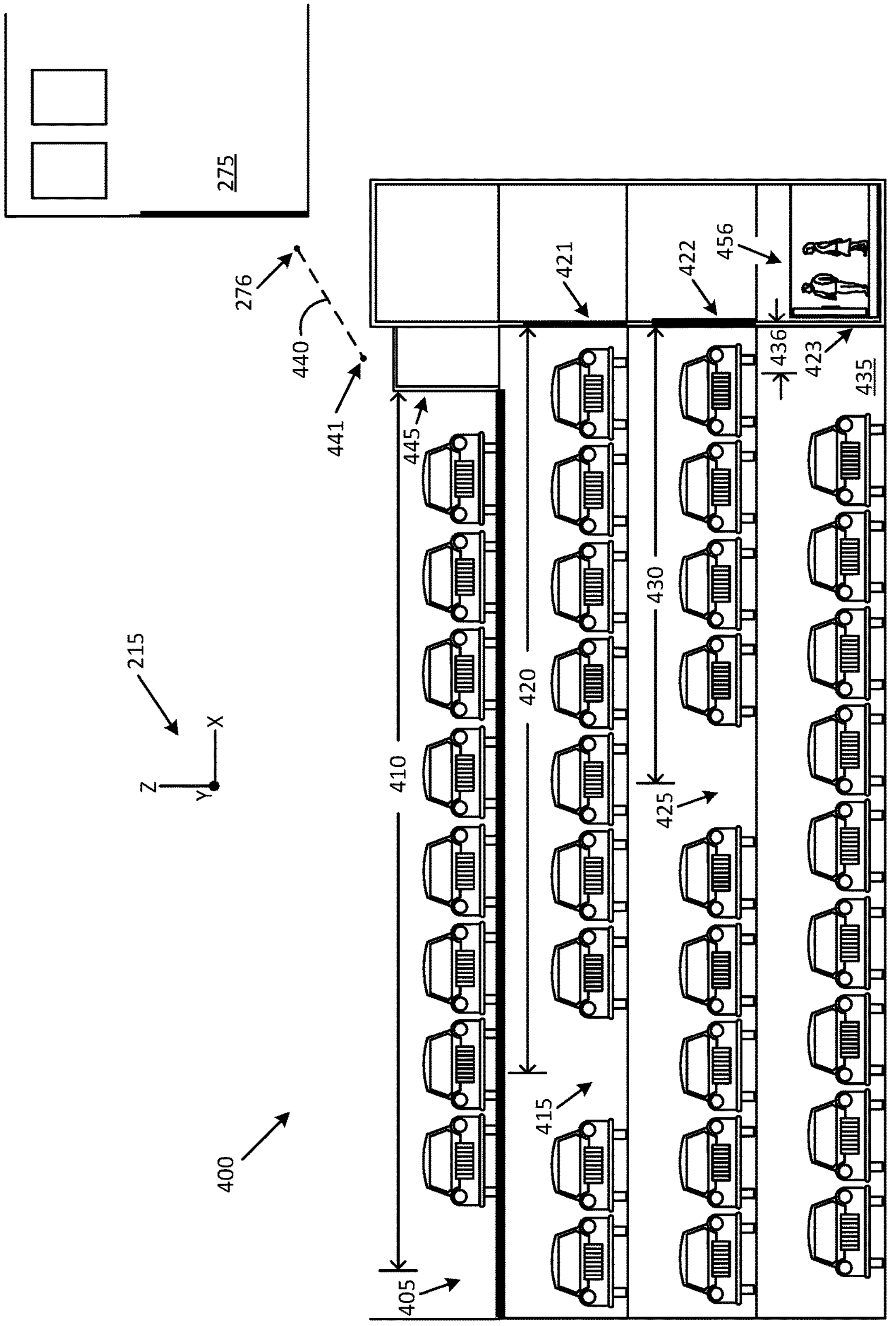
FIG. 4 shows a third example scenario where a parking assistance system may be used in accordance with an embodiment of the disclosure.

FIG. 4 shows a third example scenario where the parking assistance system 125 may be used in accordance with an embodiment of the disclosure. The multi-level parking structure 400 shown in this figure has a ground level parking deck and three parking decks located below the ground level parking deck. A pedestrian exit 445 is located at ground level and an elevator 456 can be used to travel up from any of the lower-level parking decks to the ground level parking deck.

In the illustrated example, a first separation distance 410 between an unoccupied parking spot 405 on the ground floor parking deck and the pedestrian exit 445 is greater than a second separation distance 420 between an unoccupied parking spot 415 on a first lower-level parking deck and an elevator door 421 on the first lower-level parking deck. The second separation distance 420 is greater than a third separation distance 430 between an unoccupied parking spot 425 on a second lower-level parking deck and an elevator door 422 on the second lower-level parking deck. The third separation distance 430 happens to be to be greater than a fourth separation distance 436 between an unoccupied parking spot 435 on a third lower-level parking deck and an elevator door 423 on the third lower-level parking deck.

The vertical distances between the lower-level parking decks and the ground floor are disregarded by the parking assistance system 125 when determining the shortest walking distance. Thus, in the illustrated example scenario, the unoccupied parking spot 435 on the third lower-level parking deck offers the shortest walking distance to the destination. The shortest walking distance includes a walking path 440 between a point 441 at the pedestrian exit 445 of the multi-level parking structure 400 and the entry 276 to the building 275. The walking path 440 is common to all pedestrians moving between the multi-level parking structure 400 and the building 275 and may be disregarded by the parking assistance system 125 when determining a shortest cumulative walking distance between any unoccupied parking spot in the multi-level parking structure 400 and the entry 276 to the building 275.

In an example embodiment, after determining the shortest cumulative walking distance, the parking assistance system 125 of the vehicle 105 provides guidance to the driver 110 in the form of, for example, turn-by-turn driving instructions displayed on a display screen of the infotainment system 135 for reaching the unoccupied parking spot 435 on the third lower-level parking deck.

Figure 5:
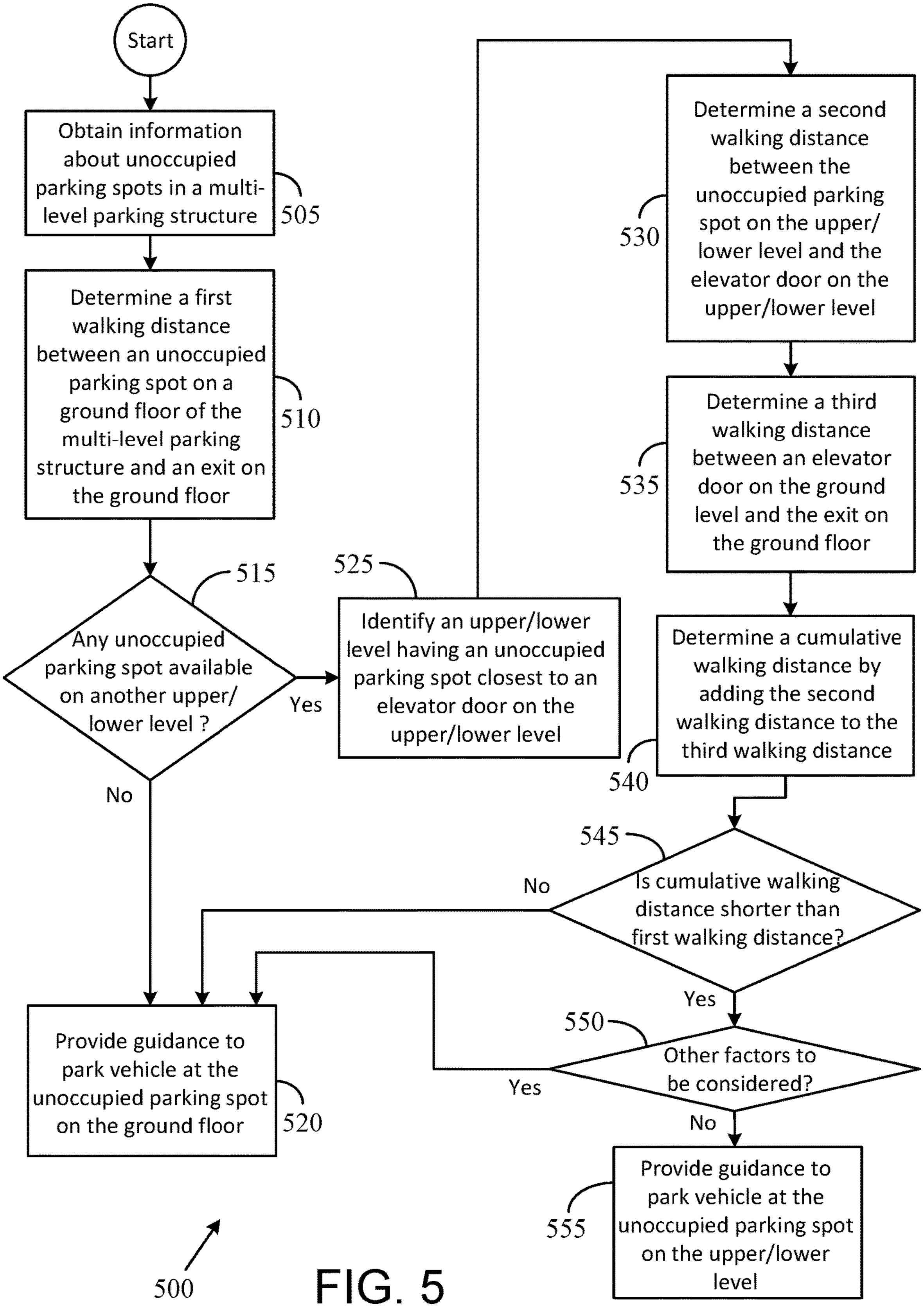
FIG. 5 shows a flowchart that illustrates a first example method to obtain parking assistance in a multi-level parking structure in accordance with an embodiment of the disclosure.

FIG. 5 shows a flowchart 500 that illustrates a first example method to obtain parking assistance in a multi-level parking structure in accordance with an embodiment of the disclosure. In this example, the multi-level parking structure has a single vehicle entrance and a single pedestrian exit on a ground floor. The flowchart 500 (and the flowchart 600 described below) illustrates a sequence of operations that can be implemented in hardware, software, or a combination thereof. In the context of software, the operations represent computer-executable instructions stored on one or more non-transitory computer-readable media such as the memory 127, that, when executed by one or more processors such as the processor 126, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. The description below may make reference to certain components and objects shown in FIGS. 1 through 4, but it should be understood that this is done for purposes of explaining certain aspects of the disclosure and that the description is equally applicable to many other embodiments.

At block 505, a parking assistance system provided in a vehicle obtains information about one or more unoccupied parking spots available in a multi-level parking structure either prior to the vehicle entering the multi-level parking structure or upon the vehicle entering the multi-level parking structure. The information may be obtained, for example, from a server computer and/or from a cloud computer. In an example implementation, the server computer and/or the cloud computer may obtain information about the availability of parking spots in the multi-level parking structure based on evaluating images and/or video captured by cameras located in the multi-level parking structure. In one case, the images may be captured in real-time on a continuous basis. In another case, information may be collected dynamically whenever vehicle activity is detected in the multi-level parking structure such as, for example, when a vehicle exits the multi-level parking structure. In this case, one or more cameras may capture images when triggered by signals received from pressure transducers located in various parking spots.

At block 510, a first walking distance between the unoccupied parking spot on the ground floor of the multi-level parking structure and the pedestrian exit on the ground floor is determined.

At block 515, a determination is made whether any unoccupied parking spot is available on another level of the multi-level parking structure (upper-level deck or lower-level deck).

If, at block 515, it is determined that no unoccupied parking spot is available at another level, at block 520, the parking assistance system provides guidance to park the vehicle in the unoccupied parking spot on the ground floor.

If, at block 515, it is determined that another unoccupied parking spot is available on another level of the multi-level parking structure, at block 525, an upper/lower level having an unoccupied parking spot closest to an elevator door on the upper/lower level is identified.

At block 530, a second walking distance between the unoccupied parking spot on the other level and an elevator door on the other level is determined.

At block 535, a third walking distance between an elevator door on the ground floor and the pedestrian exit on the ground floor is determined.

At block 540, a cumulative walking distance is obtained by adding the second walking distance to the third walking distance.

At block 545, a determination is made whether the cumulative walking distance determined at block 540 is shorter than the first walking distance determined at block 510. If the cumulative walking distance is longer than the first walking distance, at block 520, the parking assistance system provides guidance to park the vehicle in the unoccupied parking spot on the ground level.

If the cumulative walking distance is shorter than the first walking distance, at block 550, a determination is made whether one or more factors are to be considered. Such factors can be in addition to, or in lieu of, the shorter distance consideration indicated at block 545. A first example factor can be an object that is to be carried or towed by a driver of the vehicle (and/or a passenger) after parking and exiting the vehicle. The object can be, for example, a piece of luggage, a child, a pet, or a heavy package. A second example factor can be a physical attribute of the driver and/or passenger. In some cases, the driver and/or passenger may have a physical handicap and/or may require the use of a wheelchair. A third example factor can be time-related where the driver/passenger is in a rush and desires to park the vehicle as quickly as possible.

If the determination at block 550 indicates that one or more of such factors are to be taken into consideration and parking the vehicle based on the shortest walking distance is to be avoided, at block 520, the parking assistance system provides guidance to park the vehicle in the unoccupied parking spot on the ground floor.

If the determination at block 550 indicates that such factors are not applicable, at block 555, the parking assistance system provides guidance to park the vehicle in the unoccupied parking spot on the other parking level.

Figure 6:
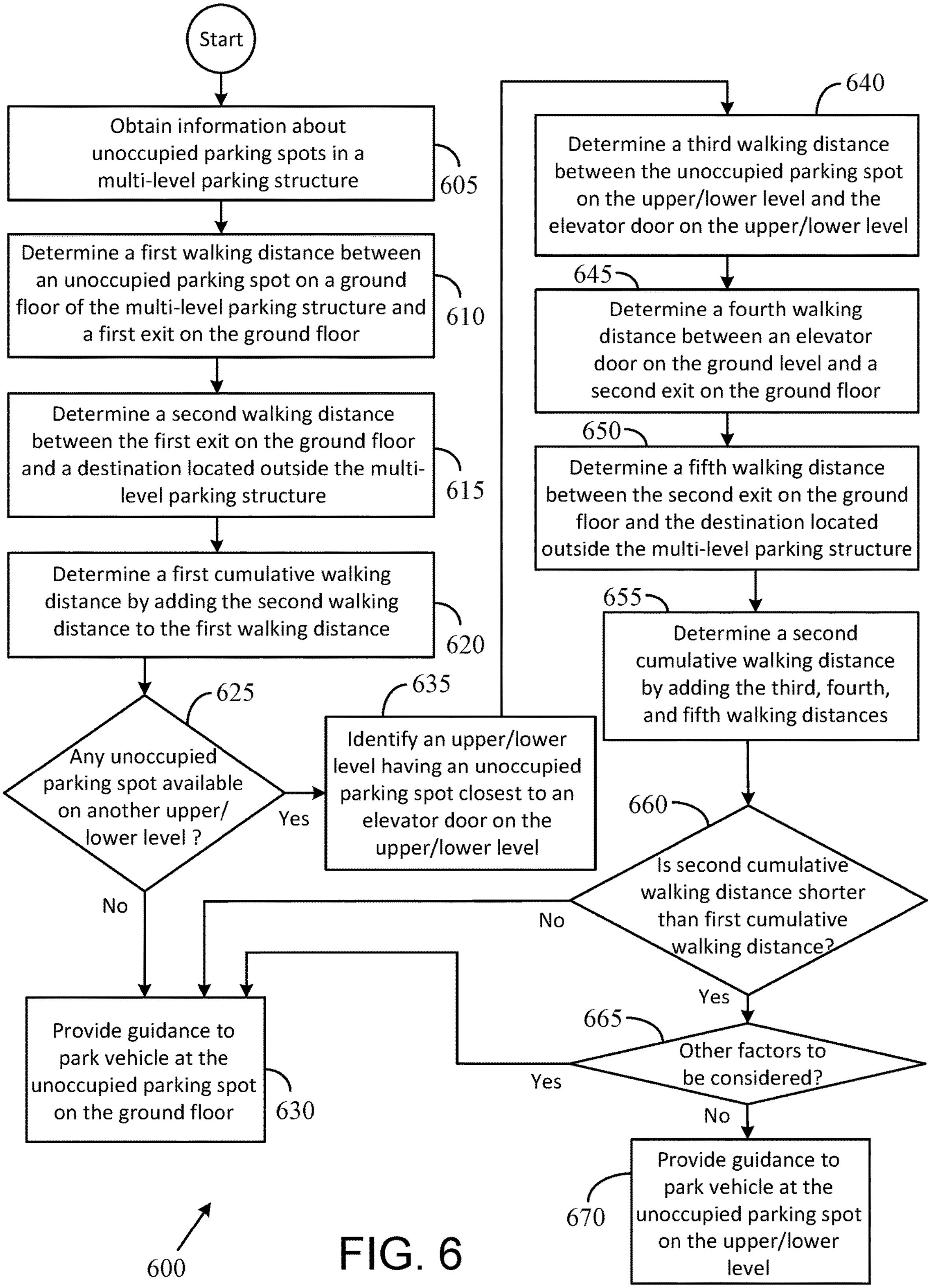
FIG. 6 shows a flowchart that illustrates a second example method to obtain parking assistance in a multi-level parking structure in accordance with an embodiment of the disclosure.

FIG. 6 shows a flowchart 600 that illustrates a second example method to obtain parking assistance in a multi-level parking structure in accordance with an embodiment of the disclosure. In this example, the multi-level parking structure has a single vehicle entrance and two pedestrian exits on a ground floor.

At block 605, a parking assistance system provided in a vehicle obtains information about one or more unoccupied parking spots available in the multi-level parking structure either prior to the vehicle entering the multi-level parking structure or upon the vehicle entering the multi-level parking structure. The information may be obtained, for example, from a server computer and/or from a cloud computer. In an example implementation, the server computer and/or the cloud computer may obtain information about the availability of parking spots in the multi-level parking structure based on evaluating images and/or video captured by cameras located in the multi-level parking structure. In one case, the images may be captured in real-time on a continuous basis. In another case, information may be collected dynamically whenever vehicle activity is detected in the multi-level parking structure such as, for example, when a vehicle exits the multi-level parking structure. In this case, one or more cameras may capture images when triggered by signals received from pressure transducers located in various parking spots.

At block 610, a first walking distance between the unoccupied parking spot on the ground floor of the multi-level parking structure and a first pedestrian exit on the ground floor is determined.

At block 615, a second walking distance between the first pedestrian exit on the ground floor and a destination located outside the multi-level parking structure is determined.

At block 620 a first cumulative walking distance is determined by the adding the second separation distance to the first separation distance.

At block 625, a determination is made whether any unoccupied parking spot is available on another level of the multi-level parking structure (upper-level deck or lower-level deck).

If, at block 625, it is determined that no unoccupied parking spot is available at another level, at block 630, the parking assistance system provides guidance to park the vehicle in the unoccupied parking spot on the ground floor.

If, at block 625, it is determined that another unoccupied parking spot is available on another level of the multi-level parking structure, at block 635, an upper-level and/or lower-level parking deck that has an unoccupied parking spot closest to an elevator door on the respective parking deck is identified. For example, a second level parking deck may have an unoccupied parking spot that is located at a first separation distance from an elevator door on the second level parking deck and a third level parking deck may have an unoccupied parking spot that is located at a second separation distance from an elevator door on the third level parking deck. The second separation distance may be shorter than the first separation distance. Accordingly, in this example, at block 635, the third level parking deck is identified.

At block 640, a third walking distance between an unoccupied parking spot on the upper-level and/or lower-level parking deck (identified at block 635) and an elevator door on the upper-level and/or lower-level parking deck (identified at block 635) is determined. In the example above, the third walking distance corresponds to a walking distance between the unoccupied parking spot and the elevator door on the third level parking deck.

At block 645, a fourth walking distance between an elevator door on the ground floor and a second pedestrian exit on the ground floor is determined.

At block 650, a fifth walking distance between the second pedestrian exit and a destination located outside the multi-level parking structure is determined.

At block 655, a second cumulative walking distance is calculated by adding the third, fourth, and fifth walking distances.

At block 660, a determination is made whether the second cumulative walking distance is shorter than the first cumulative walking distance.

If, at block 660, it is determined that the second cumulative walking distance is not shorter than the first cumulative walking distance, at block 630, the parking assistance system provides guidance to park the vehicle in the unoccupied parking spot on the ground floor.

If, at block 660, it is determined that the second cumulative walking distance is shorter than the first cumulative walking distance, at block 665, a determination is made whether one or more factors are to be considered. Such factors can be in addition to, or in lieu of, the shorter distance consideration indicated at block 660. Some example factors are described above with reference to block 550 of the flowchart 500 and are equally relevant here as well. An additional example factor in this scenario, is a difference in terrain, if such a difference is present, between a first walking path from the first exit on the ground floor to the destination and a second walking path from the second exit on the ground floor to the destination. For example, the first walking path may be substantially flat whereas the second walking path may include a slope or a gradient that makes it difficult for the driver and/or passenger of the vehicle to traverse as a result of a physical handicap or an object being carried by hand.

If the determination at block 660 indicates that one or more of such factors are to be taken into consideration and parking the vehicle based on the shortest walking distance is to be avoided, at block 630, the parking assistance system provides guidance to park the vehicle in the unoccupied parking spot on the ground floor.

If the determination at block 660 indicates that such factors are not applicable, at block 670, the parking assistance system provides guidance to park the vehicle on the upper-level or lower-level parking deck that has the unoccupied parking spot closest to the elevator door on the parking deck.

Figure 7:
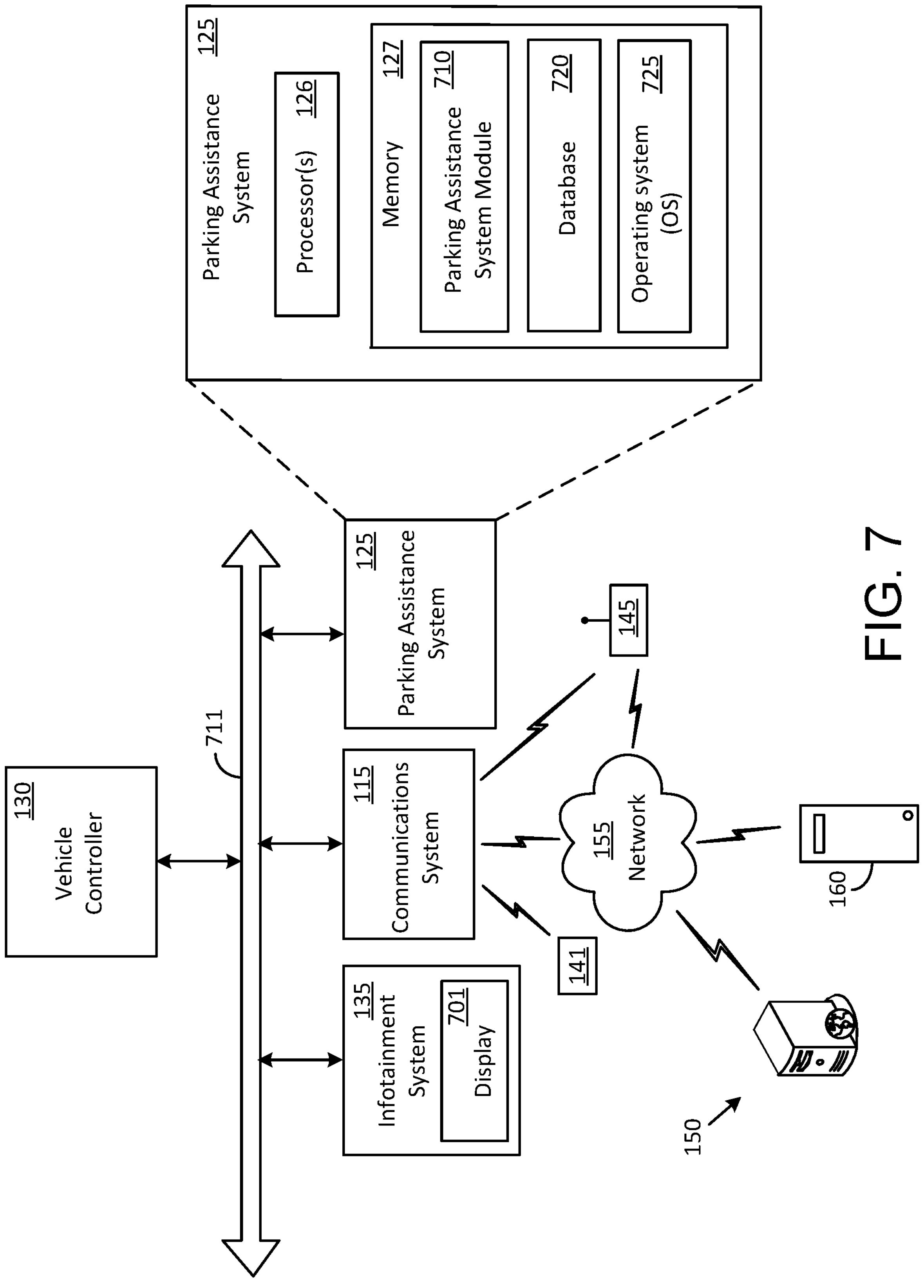
FIG. 7 shows some functional components that may be included in a vehicle that includes a parking assistance system in accordance with an embodiment of the disclosure.

FIG. 7 shows some functional components that may be included in the example vehicle 105 in accordance with an embodiment of the disclosure. The example components can include the vehicle controller 130, the infotainment system 135, the communications system 115, and the parking assistance system 125. The various components are communicatively coupled to each other via one or more buses such as an example bus 711. The bus 711 may be implemented using various wired and/or wireless technologies. For example, the bus 711 can be a vehicle bus that uses a controller area network (CAN) bus protocol, a Media Oriented Systems Transport (MOST) bus protocol, and/or a CAN flexible data (CAN-FD) bus protocol. Some or all portions of the bus 711 may also be implemented using wireless technologies such as Bluetooth®, Ultra-Wideband, Wi-Fi, Zigbee®, or near-field-communications (NFC). In an example implementation, a Matter protocol, which is a unifying, IP-based connectivity protocol may be used. The Matter protocol provides interoperability among various devices including artificial intelligence robots, drones, and Internet-of-Things (IoT) platforms.

The vehicle controller 130 can be operated to execute various operations related to the vehicle 105, such as, for example, controlling engine operations (fuel injection, speed control, emissions control, braking, etc.), managing climate controls (air conditioning, heating etc.), activating airbags, and issuing messages (check engine light, bulb malfunction, low tire pressure, etc.), and also for executing various operations in accordance with disclosure.

The infotainment system 135 can include a display system 701 having a GUI for carrying out various operations. The GUI may be used, for example, by the driver 110 to interact with the parking assistance system 125 and to execute actions associated with parking the vehicle 105 in a multi-level parking structure The communications system 115 can include various components such as, for example, a wireless transmitter, a wireless receiver, and/or a wireless transceiver, that are configured to allow the parking assistance system 125 to communicate with devices such as, for example, the computer 160, the cloud computer 150, the IoT communication system 145, and the example parking assistance system 141 (of the example vehicle 140), that are shown in FIG. 1). The communications may be carried out via wireless signals either directly or via the network 155 by use of any of various communication formats such as, for example, WiFi, cellular, TCP/IP, Bluetooth®, Ultra-Wideband, Wi-Fi, Ultra-Wideband (UBW), Zigbee®, and near-field-communications (NFC).

In one implementation, the parking assistance system 125 can be an independent device (enclosed in an enclosure, for example). In another implementation, some or all components of the parking assistance system 125 can be housed, merged, or can share functionality, with the vehicle controller 130. For example, an integrated unit that combines the functionality of the parking assistance system 125 with that of the vehicle controller 130 can be operated by a single processor and a single memory device. In the illustrated example configuration, the parking assistance system 125 includes the processor 126, and the memory 127.

The memory 127, which is one example of a non-transitory computer-readable medium, may be used to store an operating system (OS) 725, a database 720, and various code modules such as a parking assistance system module 710. The code modules are provided in the form of computer-executable instructions that can be executed by the processor 126 for performing various operations in accordance with the disclosure.

The database 720 may be used to store information such as, for example, location coordinates and separation distances associated with a multi-level parking structure.

The parking assistance system module 710 may be executed by the processor 126 for performing various operations in accordance with the disclosure, including, execution of operations included in the example flowchart 500 and example flowchart 600 described above.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. More particularly, it must be understood that various operations described above with respect to the parking assistance system 125 of the vehicle 105 can be executed by various other devices such as, for example, the computer 160 (and vice-versa). The computer 160 may execute these operations either independently, or in cooperation with the parking assistance system 125.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 127, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:

determining, by a processor, a first walking distance between a first unoccupied parking spot on a first parking level of a multi-level parking structure and a destination located outside the multi-level parking structure;

determining, by the processor, a second walking distance between a second unoccupied parking spot on a second parking level of the multi-level parking structure and the destination located outside the multi-level parking structure;

comparing, by the processor, the first walking distance to the second walking distance; and providing, by the processor, based on the first walking distance and the second walking distance, guidance to drive to one of the first unoccupied parking spot or the second unoccupied parking spot, wherein the first parking level is located on a ground floor of the multi-level parking structure, the second parking level is one of above or below the ground floor, and wherein determining the second walking distance comprises:

determining, by the processor, on the second parking level, a first separation distance between the second unoccupied parking spot and a first door of an elevator on the second parking level;

determining, by the processor, on the ground floor, a second separation distance between a second elevator door on the ground floor and a first pedestrian exit of the multi-level parking structure;

determining, by the processor, a third separation distance between the first pedestrian exit of the multi-level parking structure and the destination located outside the multi-level parking structure; and determining, by the processor, the second walking distance by combining the first separation distance, the second separation distance, and the third separation distance.

2. The method of claim 1, wherein the third separation distance is determined by applying Pythagoras theorem upon a pair of Cartesian coordinates.

3. The method of claim 1, wherein determining the first walking distance comprises:

determining, by the processor, on the ground floor, a fourth separation distance between the first unoccupied parking spot and the first pedestrian exit of the multi-level parking structure; and determining, by the processor, the first walking distance by combining the fourth separation distance and the third separation distance.

4. The method of claim 1, wherein determining the first walking distance comprises:

determining, by the processor, on the ground floor, a fourth separation distance between the first unoccupied parking spot and a second pedestrian exit of the multi-level parking structure;

determining, by the processor, a fifth separation distance between the second pedestrian exit of the multi-level parking structure and the destination located outside the multi-level parking structure; and determining, by the processor, the first walking distance by combining the fourth separation distance and the fifth separation distance.

5. A method comprising:

determining, by a processor, a first set of location coordinates of a first unoccupied parking spot on a first parking level of a multi-level parking structure;

determining, by the processor, a second set of location coordinates of a second unoccupied parking spot on a second parking level of the multi-level parking structure;

determining, by the processor, a third set of location coordinates of a destination located outside the multi-level parking structure;

determining, by the processor, a first separation distance between the first set of location coordinates and the third set of location coordinates;

determining, by the processor, a second separation distance between the second set of location coordinates and the third set of location coordinates;

comparing, by the processor, the first separation distance to the second separation distance; and determining, by the processor, a walking route based, at least on, on a shorter of the first separation distance and the second separation distance, wherein determining the walking route comprises:

identifying, by the processor, based on the shorter of the first separation distance and the second separation distance, one of the first unoccupied parking spot or the second unoccupied parking spot;

determining, by the processor, that the one of the first unoccupied parking spot or the second unoccupied parking spot is located on one of the first parking level or the second parking level that is one of above or below a ground floor of the multi-level parking structure;

determining, by the processor, a first walking distance between the one of the first unoccupied parking spot or the second unoccupied parking spot and an elevator on the one of the first parking level or the second parking level that is one of above or below the ground floor of the multi-level parking structure;

determining, by the processor, a second walking distance on the ground floor between the elevator and the destination;

determining, by the processor, a walking distance based on combining the first walking distance and the second walking distance; and displaying, by the processor, on a display screen of a device, the walking route and the walking distance.

6. The method of claim 5, wherein the first set of location coordinates is a first set of Cartesian coordinates, wherein the second set of location coordinates is a second set of Cartesian coordinates, wherein the third set of location coordinates is a third set of Cartesian coordinates, wherein the first separation distance comprises a first diagonal distance that is determined by applying Pythagoras theorem upon the third set of Cartesian coordinates and a fourth set of Cartesian coordinates corresponding to an pedestrian exit of the multi-level parking structure.

7. A vehicle comprising:

a device that includes a display screen; and a parking assistance system comprising:

a memory that stores computer-executable instructions; and a processor configured to access the memory and execute the computer-executable instructions to perform operations comprising:

determining a first walking distance between a first unoccupied parking spot on a first parking level of a multi-level parking structure and a destination located outside the multi-level parking structure;

determining a second walking distance between a second unoccupied parking spot on a second parking level of the multi-level parking structure and the destination located outside the multi-level parking structure;

comparing the first walking distance to the second walking distance; and providing, via the device and based on a shorter of the first walking distance and the second walking distance, guidance to drive to one of the first unoccupied parking spot or the second unoccupied parking spot, wherein the first parking level is one of above or below a ground floor of the multi-level parking structure, and wherein the processor is configured to access the memory and execute the computer-executable instructions to perform further operations comprising:

determining, on the first parking level, a first separation distance between the first unoccupied parking spot and a door of an elevator on the first parking level;

determining, on the ground floor, a second separation distance between the destination and one of the door of the elevator or an pedestrian exit of the multi-level parking structure; and determining the second walking distance by combining the first separation distance and the second separation distance.

8. The vehicle of claim 7, wherein the second separation distance is determined by applying Pythagoras theorem upon a pair of Cartesian coordinates.

9. The vehicle of claim 7, wherein the device that includes the display screen is one of an infotainment system of the vehicle or a personal device carried by an occupant of the vehicle.

10. The vehicle of claim 9, wherein the processor is configured to access the memory and execute the computer-executable instructions to perform further operations comprising: sending to the personal device step-by-step navigation assistance to assist in walking to the destination.

* * * * *